United States Patent
Pfeifer et al.

(10) Patent No.: US 8,396,689 B2
(45) Date of Patent: Mar. 12, 2013

(54) METHOD FOR ANALYSIS OF THE OPERATION OF A GAS TURBINE

(75) Inventors: Uwe Pfeifer, Berlin (DE); Volkmar Sterzing, Neubiberg (DE)

(73) Assignee: Siemens Aktiengesellschaft, München (DE)

( * ) Notice: Subject to any disclaimer, the term of this patent is extended or adjusted under 35 U.S.C. 154(b) by 388 days.

(21) Appl. No.: 12/739,782

(22) PCT Filed: Sep. 19, 2008

(86) PCT No.: PCT/EP2008/062538
§ 371 (c)(1),
(2), (4) Date: Apr. 26, 2010

(87) PCT Pub. No.: WO2009/053183
PCT Pub. Date: Apr. 30, 2009

(65) Prior Publication Data
US 2010/0262401 A1 Oct. 14, 2010

(30) Foreign Application Priority Data
Oct. 26, 2007 (EP) .................................. 07021041

(51) Int. Cl.
G06F 19/00 (2011.01)
(52) U.S. Cl. ...................................................... 702/182
(58) Field of Classification Search ........... 702/182–185
See application file for complete search history.

(56) References Cited

U.S. PATENT DOCUMENTS

| | | | |
|---|---|---|---|
| 7,027,953 B2 | 4/2006 | Klein | |
| 2002/0013664 A1 | 1/2002 | Strackeljan et al. | |
| 2005/0107942 A1* | 5/2005 | Nomura et al. | 701/100 |

FOREIGN PATENT DOCUMENTS

| | | |
|---|---|---|
| DE | 4012278 A1 | 10/1990 |
| DE | 102006004516 B3 | 3/2007 |
| DE | 102006048730 A1 | 5/2007 |
| EP | 1521152 A2 | 4/2005 |
| RU | 2005112459 A | 9/2005 |
| RU | 2005141148 A | 5/2006 |
| WO | WO 02/03041 A1 | 1/2002 |

* cited by examiner

Primary Examiner — Edward Raymond

(57) ABSTRACT

A method for analyzing the operation of a gas turbine is provided. A neural network based upon a normal operation of the gas turbine is learned. A dynamic pressure signal is read by a pressure sensor in or on the compressor of the turbine, and an operating parameter is read by a further sensor. The dynamic pressure signal is subjected to a frequency analysis, a parameter of a frequency spectrum of the pressure signal being determined. Based upon the measured operating parameter and the parameter of the frequency spectrum of the pressure signal, the neural network is learned. The measured operating parameter and the parameter of the frequency spectrum are input parameters, and a diagnostic characteristic value representing a probability of a presence of normal operation of the gas turbine as a function of the input parameters is output.

20 Claims, 3 Drawing Sheets

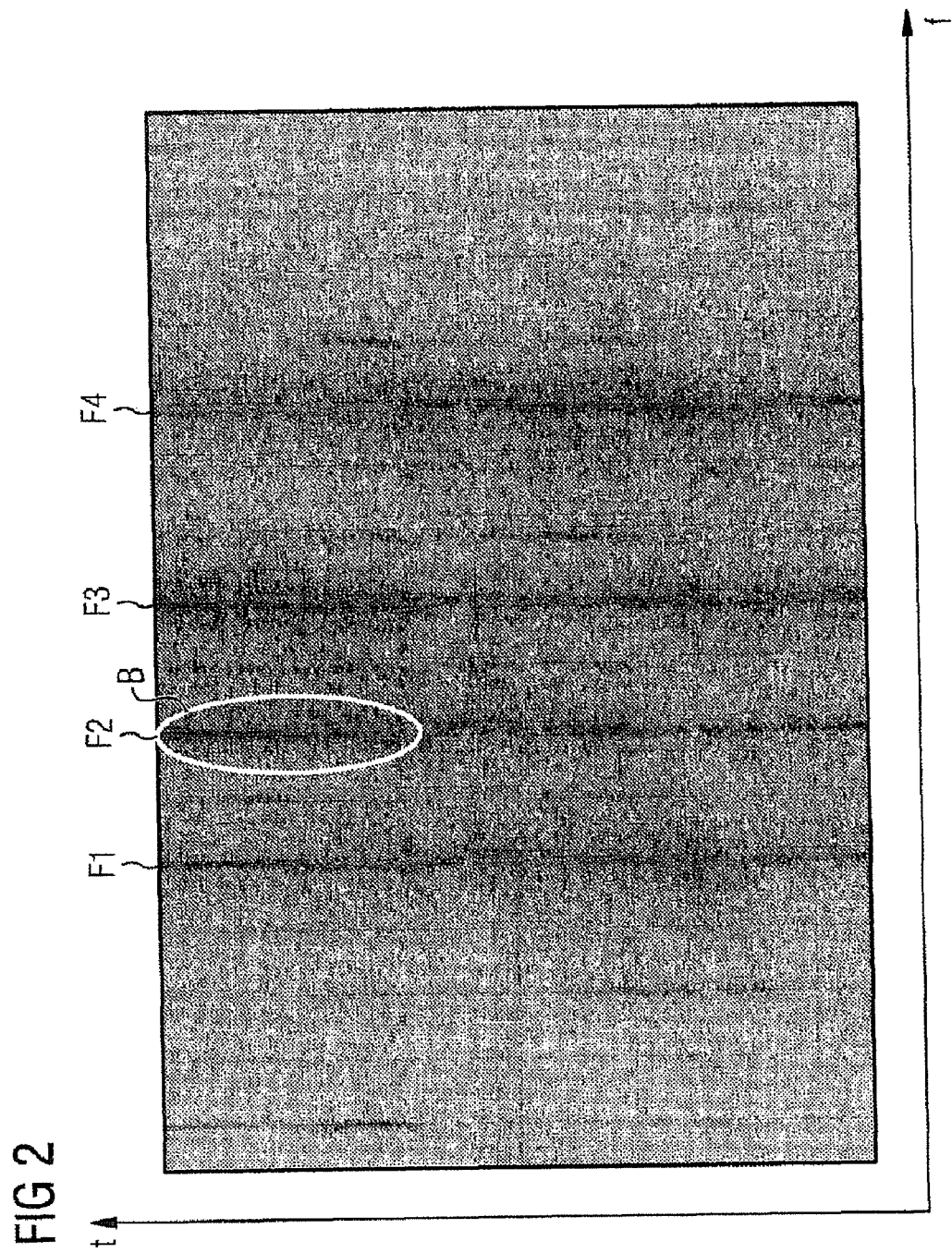

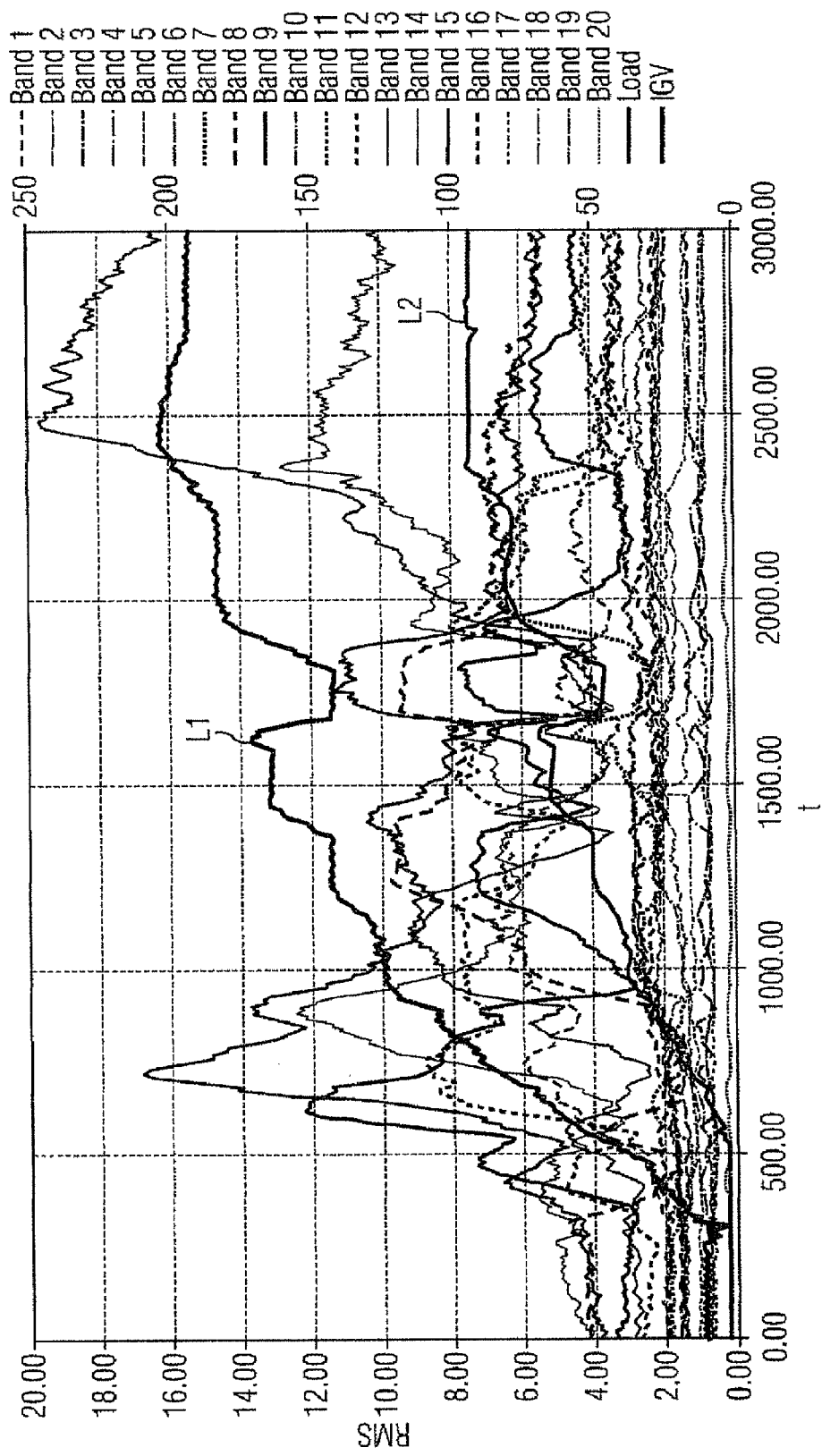

METHOD FOR ANALYSIS OF THE OPERATION OF A GAS TURBINE

CROSS REFERENCE TO RELATED APPLICATIONS

This application is the US National Stage of International Application No. PCT/EP2008/062538 filed Sep. 19, 2008, and claims the benefit thereof. The International Application claims the benefits of European Patent Application No. 07021041.4 EP filed Oct. 26, 2007. All of the applications are incorporated by reference herein in their entirety.

FIELD OF INVENTION

The invention relates to a method for analysis of the operation of a gas turbine, and to a method for monitoring the operation of a gas turbine.

BACKGROUND OF INVENTION

Modern gas turbines for power generation and industrial applications and for aircraft propulsion systems generally comprise multistage axial compressors which are subject to multiple wear, contamination and other damage mechanisms during operation, which adversely affect the operation of the compressor. Timely identification of such machine states which deviate from the normal state forms an essential precondition for carrying out precautionary maintenance measures in order to prevent both critical operating states and unacceptable wear.

Clear classification and quantification of wear and damage are particularly important for diagnosis and monitoring of modern gas turbines. In particular, it is desirable in the case of gas turbines with multistage axial compressors to be able to indicate precisely the compressor stage in which the wear or damage feature has occurred, and how severely and how widely the damage has progressed with respect to a defined limit value. A further aim is to carry out diagnosis and monitoring processes for gas turbines during normal operation, without having to shut down the turbine.

Various diagnosis and monitoring methods for turbines are known from the prior art. By way of example, DE 40 12 278 A1 discloses a state diagnosis system for a steam turbine installation having a neural network model. With the aid of the model, the system can learn a plurality of information patterns, relating to oscillations that are dependent on the operating state, in advance, in order to produce an output signal, which indicates the operating state, when these occur. Waveforms of mechanical or acoustic oscillations, vibrations or electromagnetic oscillations are used and processed for this purpose.

In addition, a quality or classification subdivision is known from US 2002/0013664 A1 for monitoring rotating components on the basis of machine states. In this case, pressure pulsations of compressor air may be used as one of the possible input variables. A further method is known from U.S. Pat. No. 7,027,953 B2.

These methods, for example that in U.S. Pat. No. 7,027,953 B2, in which pressure sensors are used for each compressor stage to be observed, require a very high degree of instrumentation in the form of a large number of sensors, and they can detect only serious damage, for example the loss of a blade. Furthermore, methods such as these cannot precisely associate the damage with one compressor stage when using gas turbines with multistage axial compressors.

SUMMARY OF INVENTION

An object of the invention is to provide a method for analysis and monitoring of the operation of a gas turbine, which allows accurate diagnosis of wear and damage to the turbine, with few sensors.

This object is achieved by the independent patent claims. Developments of the invention are defined in the dependent claims.

According to the inventive method, one or more neural networks is or are trained on the basis of normal operation of the gas turbine. In this case, a dynamic pressure signal is first of all measured by at least one pressure sensor in or on, and/or behind the compressor of the turbine, in which case a dynamic pressure signal means that the rate of change of the pressure signal is recorded. Preferred sampling rates for recording the pressure signal are in the kHz range. The pressure changes in the compressor in this case occur as a result of the rotor blades passing, that is to say passing by, the guide vanes, leading to considerable pressure fluctuations in the compressed air. In addition to this dynamic pressure signal, one or more operating parameters of the gas turbine is or are also measured by further sensors. The method according to the invention can therefore be carried out during operation of the turbine. If required, the dynamic pressure signal and the further operating parameters will have already been recorded in advance, and are then read in, for example from a file, for use in the method according to the invention.

According to the invention, the dynamic pressure signal is subjected to a frequency analysis, as a result of which one or more parameters of the frequency spectrum of the pressure signal is or are determined. This makes use of the knowledge that pressure fluctuations are produced cyclically for each compressor stage in the compressor as a result of the interaction of the guide vanes and rotor blades, leading to a cyclic signal which can be used in order to specify normal operation and an operating state which deviates from this.

Finally, one or more neural networks are trained on the basis of the measured operating parameter or parameters and the parameter or parameters of the frequency spectrum of the pressure signal, which have, as input variables, the measured operating parameter or parameters and the parameter or parameters of the frequency spectrum of the pressure signal and, as output variables, have at least one diagnosis characteristic value, which represents a probability measure of the presence of normal operation of the gas turbine, as a function of the input variables.

The method according to the invention is distinguished in that the normal operation of a compressor of a gas turbine can be described by the analysis of a dynamic pressure signal in combination with neural networks having a small number of sensors. In this case, the method is universally applicable to any gas turbines and just needs to be trained initially by measurement of operating parameters and the pressure signal of the gas turbine under consideration. During subsequent monitoring operation, the neural networks can then be used to distinguish in a simple manner between the normal operation that has been learnt or else a discrepancy from it, in that the operating parameters recorded during monitoring, including the dynamic pressure signal, are supplied as input variables to the neural networks.

The method according to the invention is used for a multistage compressor of a gas turbine having a number of compressor stages, wherein, in this case, a characteristic frequency band is determined by the frequency analysis as a parameter of the frequency spectrum for each compressor stage, and, for each characteristic frequency band, the energy component of the pressure signal contained therein is calculated, in particular as an RMS value (RMS=Root Mean Square). This energy component is in this case used as an input variable for the neural network or networks. The RMS value has been known for a long time from the prior art and is obtained by integration of the amplitudes associated with the individual frequencies, over the frequencies in the frequency band. The method according to the invention is therefore very highly suitable for multistage compressors, since the characteristics of the individual compressor stages are described very well by a corresponding frequency band, which can be determined by means of the frequency analysis from the dynamic pressure signal. This provides the capability to be able to detect a malfunction specifically for individual compressor stages. Alternatively or in addition to the RMS value, it is also possible to use the maximum amplitude value of a frequency line or the maximum amplitude values of a plurality of adjacent frequency lines in a characteristic frequency band, as input variables.

The method according to the invention preferably makes use of so-called radial basis function networks (also referred to as RBF networks) which have been known for a long time from the prior art. Further developments of such networks can likewise be used. These networks comprise a multiplicity of radial basis functions, for example Gaussian functions, in the concealed layer, in which case the parameters of these Gaussian functions are learnt. In the invention described here, as a target variable of the radial basis functions, the probability is learnt of a parameter combination of the measured operating parameters and of the dynamic pressure occurring during the normal operation. The document WO 99/48020 A2 describes the use of radial basis function networks in conjunction with the monitoring of the rolling force in a steel rolling mill. The principles disclosed there can be transferred analogously to the analysis according to the invention of the compressor of a gas turbine. In a further preferred embodiment of the method according to the invention, the at least one diagnosis characteristic value represents a confidence value which is normalized in a value range between 0 and 1 and represents the probability that a respective parameter combination of input variables is a parameter combination known during normal operation of the gas turbine. This provides a simple representation of the diagnosis characteristic value, in which case a confidence value close to 1, in particular, indicates that the gas turbine is operating normally, and confidence values of less than 0.5 indicate that unusual parameter combinations have occurred, which lead to the conclusion that there is a fault in the operation of the compressor.

In a further refinement of the method according to the invention, the ratio of the energy component of a characteristic frequency band to the energy components of harmonics of the characteristic frequency band can be taken into account as a further parameter of the frequency spectrum for training the neural networks.

When using the method according to the invention in multistage compressors, a neural network is preferably trained for each compressor stage, wherein the parameters of the frequency spectrum which belong to a characteristic frequency band are associated as input variables with the respective neural network. The association is therefore obtained from the characteristic frequency of the respective compressor stage, which results from the number of blades in that compressor stage and the current rotation speed of the gas turbine. In this case, each neural network has a diagnosis characteristic value as an output variable, wherein this diagnosis characteristic value represents a probability measure for the presence of normal operation of the respective compressor stage, as a function of the input variables. When using neural networks to monitor the gas turbine, this makes it possible to detect the compressor stages in which there are malfunctions. In a further refinement, the individual diagnosis characteristic values of the compressor stages can in this case be combined to form an overall diagnosis characteristic value, wherein the combination process is carried out on the basis of specific rules, for example on the basis of fuzzy rules or else on the basis of discrete rules.

In one preferred embodiment of the method according to the invention, fast Fourier transformation, which requires little computation time and transforms the signal from the time domain to the frequency domain, is used for frequency analysis of the dynamic pressure signal.

In particular, one or more of the following parameters may be considered as operating parameters which are recorded in addition to the dynamic pressure signal according to the invention:
the rotation speed of the gas turbine;
the load on the gas turbine;
the ambient pressure;
the ambient temperature;
the air humidity;
the position of the guide vanes on the compressor in the gas turbine.

Suitable normal operation, during which the corresponding operating parameters and the dynamic pressure signal are determined, is preferably configured in such a way that, during this operation, the gas turbine is operated at a fixed rotation speed for different loads and/or positions of the guide vanes.

The method described above, by means of which neural networks are trained on the basis of normal operation of a gas turbine, can in particular be implemented in the form of a computer program product. This computer program product contains a program code, which is stored in a machine-legible medium, for carrying out the method when the program is run on a computer.

As already described in the previous text, the neural networks which have been trained according to the invention are then used for monitoring the gas turbine in order to detect operating states which deviate from normal operation. The invention therefore also covers a method for monitoring a gas turbine based on the network or networks which has or have been trained using the method described above. The variables measured for these monitoring methods are essentially the same as those measured during the corresponding training method. Instead of training the neural networks, the measured variables are now supplied as input variables to the networks that have been trained, resulting in the corresponding diagnosis characteristic value which reflects the probability of a normal operating state being present.

In particular, the following steps are therefore carried out in the monitoring method during operation of the gas turbine:
At least one dynamic pressure signal is measured by at least one pressure sensor in or on the compressor of the gas turbine and, furthermore, one or more operating parameters of the gas turbine is or are measured by further sensors.
The dynamic pressure signal is subjected to a frequency analysis, as a result of which one or more parameters of the frequency spectrum of the pressure signal is or are determined.
The measured operating parameter or parameters and the parameter or parameters of the frequency spectrum of the pressure signal are supplied as input variables to the trained neural network or networks, and the at least one diagnosis characteristic value is output as output variable from the neural network or networks.

If required, a warning can be output in the monitoring method when one or more of the diagnosis characteristic values is or are outside a predetermined value range, that is to say when the diagnosis characteristic value indicates that there is a high probability of a state which deviates from normal operation of the gas turbine. In addition to the monitoring method described above, the invention also covers an apparatus for monitoring a gas turbine, which is designed such that the monitoring method described above can be carried out.

In particular, an apparatus such as this contains the following components:
- at least one pressure sensor for measurement of at least one dynamic pressure signal in or on the compressor of the gas turbine, as well as one or more further sensors for measurement of one or more operating parameters of the gas turbine during operation of the gas turbine;
- a frequency analysis device, by means of which the dynamic pressure signal can be subjected to a frequency analysis, as a result of which one or more parameters of the frequency spectrum of the pressure signal is or are determined;
- the neural network or networks which has or have been trained and to which the measured operating parameter or parameters and the parameter or parameters of the frequency spectrum of the pressure signal can be supplied as input variables, and which can output the at least one diagnosis characteristic value as output variables.

This monitoring apparatus preferably furthermore also has a means which allows the training process, as described above, to be carried out for the neural networks during normal operation.

The invention furthermore relates to a gas turbine which has an apparatus according to the invention for monitoring the gas turbine.

BRIEF DESCRIPTION OF THE DRAWINGS

Exemplary embodiments of the invention will be described in detail in the following text with reference to the attached figures, in which:

FIG. 2 shows a diagram which illustrates the parameters, determined according to one embodiment of the invention, of the frequency spectrum of the dynamic pressure signal; and FIG. 3 shows an illustration showing the rate of change of the RMS values, determined in one embodiment of the invention, of the pressure signal of a gas turbine, as a function of varying load and position of the guide vanes of the gas turbine.

DETAILED DESCRIPTION OF INVENTION

Figure 1:
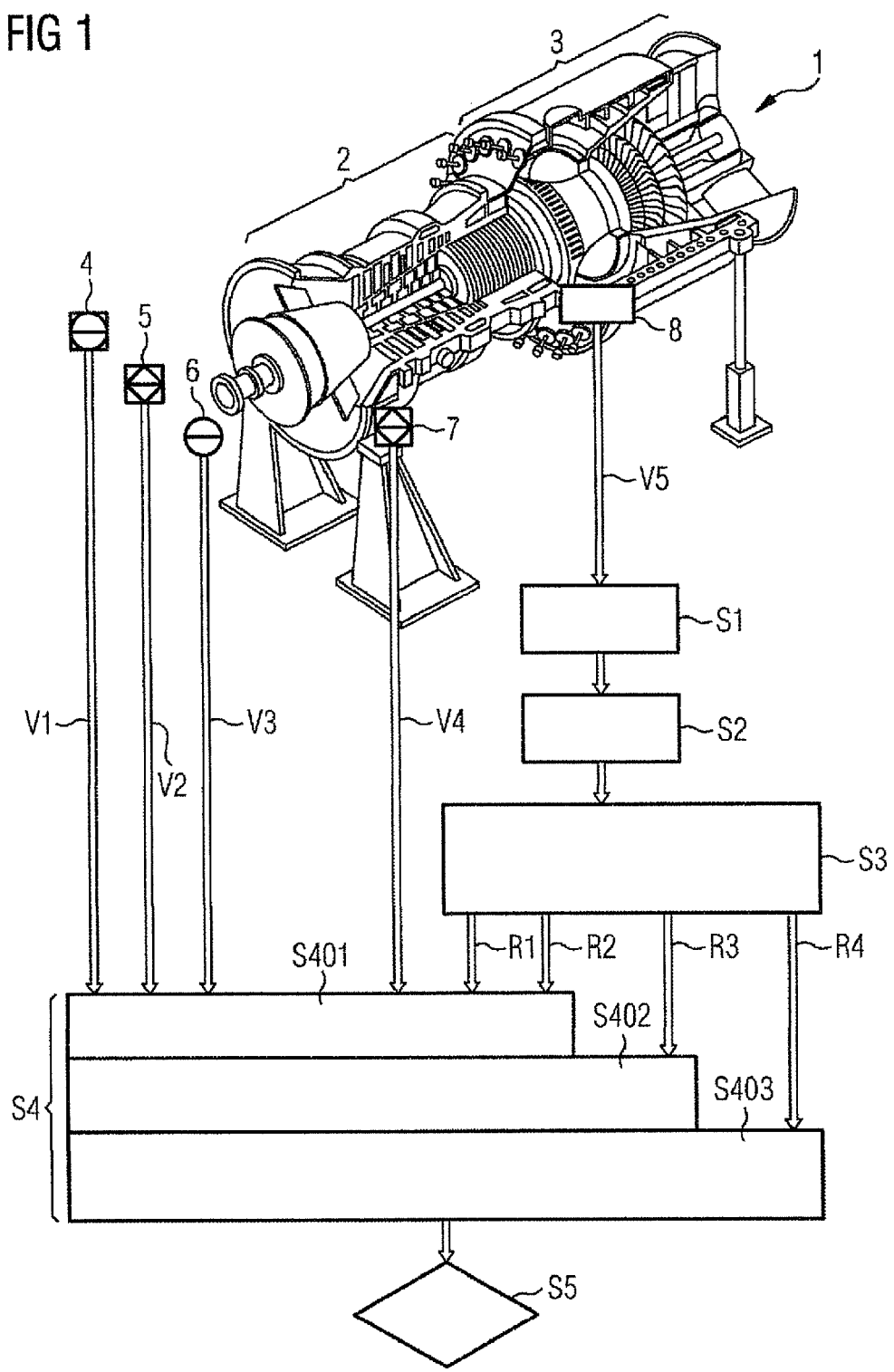
FIG. 1 shows a schematic illustration of a method for monitoring the operation of a gas turbine, according to one embodiment of the invention.

FIG. 1 shows a flowchart which illustrates the major method steps in one embodiment of a method according to the invention for monitoring the operation of a gas turbine. In the embodiment in FIG. 1, a gas turbine 1 is monitored, whose design is known per se and which will therefore be explained only briefly. The gas turbine has a multistage axial compressor 2 with a plurality of rotor disks and stator rows, with a multiplicity of compressor stages with guide vanes and rotor blades being formed in the compressor. The guide vanes set the flow angle of the air in the compressor for the rotor blades, and the rotor blades compress then pump on the air. The axial compressor 2 is followed in the turbine 3 by the combustion chamber, in which appropriate fuel is burnt with the aid of the air supplied via the compressor, thus driving the turbine.

A multiplicity of sensors is provided in the turbine illustrated in FIG. 1, and record corresponding operating parameters of the turbine. The sensor 4 is a temperature sensor which measures the ambient temperature and outputs a corresponding measurement signal V1. The sensor 5 is a pressure sensor, which measures the air pressure in the surrounding area and outputs a corresponding measurement signal V2. The reference symbol 6 denotes a humidity sensor, which measures the air humidity and outputs a corresponding measurement signal V3. Furthermore, a sensor 7 is specified, which measures the position of the variable guide vanes positioned at the inlet to the compressor, wherein the position of the guide vanes in the gas turbine can be varied by an appropriate adjustment device. In FIG. 1, the measured value of the position of the guide vanes is annotated V4.

Finally, a pressure sensor 8 is provided at the compressor outlet and dynamically measures the pressure at the compressor outlet, in the form of a measurement signal V5. In this case, dynamically means that the rate of change of the sound pressure is determined at an appropriate sampling rate such that the behavior of the pressure over time is recorded. In particular, a measurement is dynamic when the sampling rate is in the kHz range or higher. The measured pressure signal is in this case created by the compressor rotor blade passing the guide vane in the individual compressor stages during operation, and thus generating cyclic pressure waves in the compressed air, with the period of a pressure wave depending on the number of guide vanes and rotor blades in the respective compressor stage. The recorded dynamic pressure signal therefore contains a plurality of cyclic components, because of the plurality of compressor stages.

Instead of using a single pressure sensor 8, it is also possible to use a plurality of pressure sensors, and in particular already existing pressure sensors, such as those which are used in the combustor area of some gas turbines for combustion stability monitoring, can be used for measurement. Otherwise, a pressure sensor can be installed in the outlet diffuser or in the compressor air collecting area of the gas turbine. According to the invention, the signal V5 is first of all subjected in step S1 to A/D conversion, and an FFT transformation (FFT=Fast Fourier Transformation) is finally carried out in step 2, with the digitized signal, in order to determine the frequency spectrum of the signal. The FFT transformation carried out in step S2 is in this case sufficiently finely matched to the frequencies which result from the rotation speed of the gas turbine and the number of guide vanes and rotor blades that the individual frequencies can be associated with the compressor stages in a clearly separated form. The FFT transformation results in characteristic frequency bands, with corresponding amplitudes of the individual frequencies.

By way of example, the diagram in FIG. 2 shows one such frequency spectrum. This diagram is also referred to as a Campbell diagram. In this case, the frequencies f in the pressure signal are shown along the abscissa, and the time t is shown along the ordinate. The amplitude of the individual frequencies is color-coded in FIG. 2, although this color coding cannot be seen, because of the black and white representation. Normally, the color red is used to indicate high amplitudes. For example, an area B in which there are high amplitudes is marked in FIG. 2. Operating variables of the turbine determined over the time t have been varied in the illustration shown in FIG. 2. In particular, the load and the position of the compressor guide vanes were varied. In the end, this results in varying amplitudes, although characteristic frequency bands remain the same over time. In this case, FIG. 2 particularly clearly shows the frequency bands F1, F2, F3 and F4. Each of the frequency bands F1 to F4 in this case represents one compressor stage of the axial compressor 2 of the gas turbine 1, that is to say each compressor stage is associated with one frequency band, at a characteristic frequency, during operation at a specific rotation speed.

The frequency bands shown in FIG. 2 are now evaluated according to step S3 in FIG. 1, with an appropriate model being used for correction if necessary. The energy component of the pressure signal in the respective frequency band is determined in step S3 for each frequency band, by integration over the frequencies in the band, with this energy component being output as the so-called RMS value (RMS=Root Mean Square). This RMS value is a well-known variable to a person skilled in the art. As the result of step S3, a characteristic RMS value is therefore obtained for each compressor stage, with FIG. 1 showing, by way of example, four RMS values R1 to R4 for four compressor stages.

Once again in the form of an appropriate diagram, FIG. 3 illustrates the development of RMS values over time in a turbine having 20 characteristic frequency bands, which are each associated with one compressor stage of the compressor of the gas turbine. In this case, the time is plotted in seconds along the abscissa, and the corresponding RMS values of the individual bands are plotted along the ordinate. The diagram is likewise color-coded, with each band being represented by a different color, although this cannot be seen because of the black and white representation in FIG. 3. The individual frequency bands from band 1 to band 20 are in this case indicated in the legend on the right-hand edge of the diagram. In addition to the RMS values, the diagram in FIG. 3 furthermore includes the change in the load and the position of the guide vanes carried out on the turbine during operation. This is indicated by corresponding lines annotated "load" and "IGV" for the inlet guide vanes in the legend. In order to indicate the corresponding profile, the line for the rate of change of the load is annotated L1, and that for the position of the guide vanes is annotated L2. The individual values for the load and the position of the guide vanes are in this case shown as percentage values by the ordinate on the right-hand edge of the diagram.

On the one hand, FIG. 3 shows that very clear responses result in the RMS values, even for a minor change in the mass flow, on variation of the power which is achieved by varying the mass flow of the compressor. On the other hand, this also clearly shows that complex system responses can result, depending on the operating state. With the aid of the RMS values in combination with further operating parameters, of which FIG. 3 shows the load and the position of the guide vanes, it is then possible according to the invention to deduce an abnormal behavior of the gas turbine or of the compressor.

According to the invention, neural networks are used to derive a diagnosis characteristic value in a suitable manner from the measured operating parameters and the RMS values. In the embodiment of the invention described here, a neural model that is preferably based on radial basis functions is used, and is also known as an RBF network. The basic design of networks such as these is well known from the prior art and will therefore not be explained in detail at this point. Networks such as these comprise an input layer and an output layer and learn the parameters of radial basis functions, for example Gaussian functions, on the basis of the input variables in the input layer, in order in this way to approximate the functional behavior and the distribution of the input variables. In the embodiment described here, a corresponding RBF network with the operating parameters and the corresponding RMS values of the compressor stage was trained for each compressor stage, in which case the training was carried out on the basis of measurements during normal operation of the gas turbine.

The individual RBF networks produce as an output variable a confidence value which is normalized between 0 and 1 and, for a set of input variables, that is to say for operating parameters and a corresponding RMS value present at one specific time, indicates how high the probability is of such a combination of an RMS value and operating parameters occurring during normal operation. The higher this confidence value is, the more probable it is that the operation is actually normal. In contrast, low confidence values mean that there is a high probability of abnormal operation having occurred in the corresponding compressor of the gas turbine.

The correspondingly trained neural networks act as approximating data encapsulators and, in step S4 in FIG. 1, are fed in with the individual operating parameters according to the measurement signals V1 to V4 and the RMS values R1 to R4, as input variables. By way of example, step S4 is subdivided into four substeps S401, S402 and S403. In step S401, the operating parameters and the RMS values R1 and R2 are supplied to the respective neural networks for the corresponding compressor stages. In step S402, the RMS value R3 is supplied to the neural network for the corresponding compressor stage, and in step S403, the RMS value R4 is supplied to the neural network for the corresponding compressor stage. As the result of step S4, a corresponding confidence value in the value range between 0 and 1 is now obtained for each neural network. By way of example, in this case, it will be possible for a confidence value between 0.5 and 1 to derive the statement that the operating state is normal while, in contrast, confidence values of less than 0.5 indicate a diagnosis of abnormal operation. These diagnosis characteristic values are finally output in step S5. In this case, when choosing the operating parameters as input variables for the neural networks, there is no need for there to be a unique relationship between the individual parameters. In fact, any distribution of parameter combinations can be learnt provided that sufficient operating data is available to train the neural models. For high selectivity for identification of unusual states, it is recommended that all the parameters which significantly influence the system be included as input variables when training the neural network.

In summary, one and possibly a plurality of data encapsulators in the form of RBF networks are trained over a broad spectrum of different parameter combinations using the method described above for characteristic energy values of frequency bands for each compressor stage, with the trained data encapsulators then being used to monitor the gas turbine in order to detect abnormal operation. In particular, the rotation speed, the load, the inlet guide vane position, the air pressure, the ambient pressure, the air humidity and the like are considered as parameters for training, and for monitoring the gas turbine. In addition to energy amplitudes of the characteristic frequencies, the variables represent important input variables for the data encapsulators. The ratio of the RMS values of characteristic frequencies to their harmonics in higher-frequency bands can additionally be used. Furthermore, in one embodiment of the method according to the invention, the confidence values of the individual data encapsulators can be combined. This makes it possible, for example, to determine an overall confidence for the presence of normal operation. This can be done in particular on the basis of fuzzy rules or discrete rules, which express known relationships for the behavior and interaction of individual compressor stages. This means that the embodiment of the method according to the invention as described here, based on measured values of a small number of pressure sensors, can be used to diagnose the quality and the status of the individual compressor stages in the axial compressor of a gas turbine.

The method according to the invention results in a number of advantages. In particular, the state of the compressor can be diagnosed for the entire compressor even with a small number of pressure sensors, for example even with a single pressure sensor, thus reducing the overall costs for monitoring the operation of the gas turbine. Furthermore, the method according to the invention can easily be matched to different gas turbines in that the neural networks are first of all specifically trained in the training mode for that gas turbine, and the gas turbine is then monitored on the basis of these trained networks. Furthermore, the method according to the invention allows rapid and high-frequency monitoring of the overall compressor in a gas turbine during operation, in particular making it possible to obtain long-term information over the running time of the gas turbine. Finally, gradual changes in comparison to the normal state of the gas turbine can also be identified by averaging the confidence values over a relatively long time period. This makes it possible to reduce the maintenance costs, since the diagnosis process according to the invention allows damage to be detected at any early stage, thus allowing damage-relevant maintenance of the gas turbine to be carried out, instead of maintenance being carried out at fixed intervals or on a purely preventative basis.

The invention claimed is:

1. A method of analyzing operation of a multistage compressor of a gas turbine including a plurality of compressor stages, wherein a neural network is trained based upon normal operation of the gas turbine, comprising:
   measuring a dynamic pressure signal by a pressure sensor in or on the multistage compressor;
   measuring an operating parameter of the gas turbine by a further sensor during normal operation of the gas turbine;
   performing a frequency analysis of the dynamic pressure signal, wherein a parameter of a frequency spectrum of the pressure signal is determined;
   training a neural network based upon the measured operating parameter and the parameter of the frequency spectrum of the pressure signal,
      wherein the measured operating parameter and the parameter of the frequency spectrum of the pressure signal are input variables, and
      wherein a diagnosis characteristic value representing a probability measure of a presence of normal operation of the gas turbine as a function of the input variables is an output variable;
   determining a characteristic frequency band based upon a rotation speed of the gas turbine and a number of guide vanes and rotor blades in the relevant compressor stage as a parameter of the frequency spectrum for each compressor stage; and
   calculating for each characteristic frequency band an energy component of the pressure signal contained therein, the energy component being used as input variable for the neural network.

2. The method as claimed in claim 1, further comprising:
   providing a dynamic pressure signal and an operating parameter of the gas turbine which were measured during normal operation of the gas turbine.

3. The method as claimed in claim 1, wherein the energy component of the pressure signal is selected from the group consisting of a root mean square value,
   an amplitude maximum,
   a plurality of adjacent amplitude maxima of frequency lines within the characteristic frequency band, and
   a combination thereof.

4. The method as claimed in claim 1, wherein the neural network is a radial basis function network.

5. The method as claimed in claim 1, wherein the diagnosis characteristic value is a confidence value normalized in a value range between 0 and 1 and representing the probability that a respective parameter combination of input variables is a parameter combination known during normal operation of the gas turbine.

6. The method as claimed in claim 1, wherein, as a further parameter of the frequency spectrum, a ratio of the energy component of a characteristic frequency band to the energy components of harmonics of the characteristic frequency band is taken into account for use as input variables for the neural network.

7. The method as claimed in claim 1,
   wherein for each compressor stage a neural network is trained, each neural network including as input variables parameters of the frequency spectrum which are associated with a characteristic frequency band, and including as an output variable a diagnosis characteristic value, and
   wherein the diagnosis characteristic value represents a probability measure for the presence of normal operation of the respective compressor stage as a function of the input variables.

8. The method as claimed in claim 7, further comprising:
   determining an overall diagnosis characteristic value of the diagnosis characteristic values of the respective compressor stages based upon predetermined rules.

9. The method as claimed in claim 8, wherein the predetermined rules are fuzzy rules.

10. The method as claimed in claim 1, wherein the frequency analysis which is performed for the dynamic pressure signal comprises a fast Fourier transformation.

11. The method as claimed in claim 1, wherein the operating parameter to be measured is selected from the group consisting of
   rotation speed of the gas turbine,
   load on the gas turbine,
   ambient pressure,
   ambient temperature,
   air humidity,
   position of the guide vanes on the compressor in the gas turbine, and
   a combination thereof.

12. The method as claimed in claim 2, wherein the operating parameter to be provided is selected from the group consisting of
   rotation speed of the gas turbine,
   load on the gas turbine,
   ambient pressure,
   ambient temperature,
   air humidity,
   position of the guide vanes on the compressor in the gas turbine, and
   a combination thereof.

13. The method as claimed in claim 11, wherein the measured operating parameter and the dynamic pressure signal originate from normal operation of the gas turbine at a fixed rotation speed for different loads.

14. The method as claimed in claim 11, wherein the measured operating parameter and the dynamic pressure signal originate from normal operation of the gas turbine at a fixed rotation speed for different positions of the guide vanes.

15. The method as claimed in claim 12, wherein the measured operating parameter and the dynamic pressure signal originate from normal operation of the gas turbine at a fixed rotation speed for different loads.

16. The method as claimed in claim 12, wherein the measured operating parameter and the dynamic pressure signal originate from normal operation of the gas turbine at a fixed rotation speed for different positions of the guide vanes.

17. A method for monitoring a gas turbine, the method comprising:
providing a neural network;
measuring a dynamic pressure signal by a pressure sensor in or on a compressor of the gas turbine;
measuring an operating parameter of the gas turbine by a further sensor during normal operation of the gas turbine;
performing a frequency analysis of the dynamic pressure signal, wherein a parameter of a frequency spectrum of the pressure signal is determined;
supplying the measured operating parameter and the parameter of the frequency spectrum of the pressure signal as input variables to the neural network; and
outputting a diagnosis characteristic value as output variable from the neural network,
wherein the neural network is trained based upon the measured operating parameter and the parameter of the frequency spectrum of the pressure signal such that
a characteristic frequency band is determined based upon a rotation speed of the gas turbine and a number of guide vanes and rotor blades in the relevant compressor stage as a parameter of the frequency spectrum for each compressor stage, and
an energy component of the dynamic pressure signal is calculated for each characteristic frequency band, wherein the energy component is used as input variable for the neural network.

18. The method as claimed in claim 17, further comprising: outputting a warning signal when the diagnosis characteristic value is outside a predetermined value range.

19. An apparatus for monitoring a gas turbine, comprising:
a pressure sensor for measuring a dynamic pressure signal in or on a compressor of the gas turbine;
a further sensor for measuring an operating parameter of the gas turbine during operation of the gas turbine;
a frequency analysis device configured to perform a frequency analysis of the dynamic pressure signal, wherein, as a result, a parameter of a frequency spectrum of the pressure signal is determined; and
a neural network, the measured operating parameter and the parameter of the frequency spectrum of the pressure signal being supplied to the neural network as input variables, wherein the neural network outputs a diagnosis characteristic value as output variable,
wherein the neural network is trained based upon the measured operating parameter and the parameter of the frequency spectrum of the pressure signal such that
a characteristic frequency band is determined based upon a rotation speed of the gas turbine and a number of guide vanes and rotor blades in the relevant compressor stage as a parameter of the frequency spectrum for each compressor stage, and
an energy component of the dynamic pressure signal is calculated for each characteristic frequency band, wherein the energy component is used as input variable for the neural network.

20. The apparatus as claimed in claim 19, wherein the neural network is a radial basis function network.

* * * * *